(12) United States Patent
Craig (10) Patent No.: US 6,400,910 B1
(45) Date of Patent: Jun. 4, 2002

(54) PARTIAL PRE-EXPOSURE OF PHOTOGRAPHIC FILM

(76) Inventor: Robert Lee Craig, P.O. Box 577, 5615 Greenhill Dr., Pfafftown, NC (US) 27040

( * ) Notice: Subject to any disclaimer, the term of this patent is extended or adjusted under 35 U.S.C. 154(b) by 0 days.

(21) Appl. No.: 09/540,440

(22) Filed: Mar. 31, 2000

Related U.S. Application Data (60) Provisional application No. 60/174,926, filed on Jan. 10, 2000.

(51) Int. Cl.[7] .............................................. G03B 17/24
(52) U.S. Cl. ........................ 396/322; 396/332; 355/104; 355/117
(58) Field of Search .......................... 355/97, 104, 105, 355/108, 109, 110, 113, 117; 396/322, 332

(56) References Cited

U.S. PATENT DOCUMENTS

| | | | |
|---|---|---|---|
| 3,441,347 A | * | 4/1969 | Lassig et al. ................ 355/104 |
| 3,751,165 A | * | 8/1973 | Inoue et al. ................. 355/104 |
| 5,187,512 A | | 2/1993 | Kirkendall |
| 5,546,146 A | | 8/1996 | Dobbs et al. |
| 5,604,552 A | | 2/1997 | Ikeno |
| 5,613,165 A | | 3/1997 | Dobbs et al. |
| 5,615,396 A | | 3/1997 | Craig |
| 5,765,062 A | | 6/1998 | Dobbs et al. |
| 5,794,087 A | | 8/1998 | Dobbs et al. |
| 5,835,795 A | | 11/1998 | Craig et al. |

* cited by examiner

*Primary Examiner*—David M. Gray
(74) *Attorney, Agent, or Firm*—Robert W. Pitts (57) ABSTRACT

A photographic film strip in the form of a length of photographic film has a pre-exposed area and an unexposed area. The pre-exposed area is continuous and extends along one edge of the strip between ends of the strip. The unexposed area is also continuous and has a length suitable for making multiple single exposure frames with adjacent frames being separated by a frame line. Upon development the film, an image formed by the pre-exposed section of each print will extend between opposite edges of prints formed by individual frames without the need to preregister the film in a camera. The pre-exposure comprises a contact exposure. A strip of film can be placed in contact with a partially pre-exposed master on a cylindrical drum in a light tight housing so that pre-exposed section of the film can be exposed by one activation of an electronic flash located in the center of the drum.

14 Claims, 10 Drawing Sheets

PARTIAL PRE-EXPOSURE OF PHOTOGRAPHIC FILM

CROSS REFERENCE TO PRIOR COPENDING PROVISIONAL PATENT APPLICATION

This application claims the benefit of prior copending Provisional Patent Application Ser. No. 60/174,926 filed Jan. 10, 2000 entitled Partial Pre-Exposure of Photograph Film.

BACKGROUND OF THE INVENTION

1. Field of the Invention

This invention is related to single use cameras and to the use of pre-exposed film in cameras of this type in which a predetermined message can be included in photographs to be subsequently exposed in individual frames of the film. This invention is also related to the alignment of the pre-exposed sections of the film with the film frames to be subsequently exposed.

2. Description of the Prior Art

A typical user can incorporate multiple images into photographs by using pre-exposed film pre-loaded in a camera of the type in which the entire camera can returned for development without removing the film from the camera. A portion of the film used in these cameras has been pre-exposed so that a title or border, typically containing a separate image and/or text, will be part of each photograph. The remaining portion of each frame on this film is exposed in a single use type camera that includes an insert which prevents re-exposure of the previously exposed image. A camera of this type is shown in U.S. Pat. No. 5,853,795.

To pre-expose a stripe or border or portion of the film used in these cameras, an image is typically projected from a master image onto the film negative. The majority of each film frame remains unexposed and forms the area in which the main image will be formed on the composite photograph. U.S. Pat. No. 5,794,087 discloses an apparatus for pre-exposing a latent image on bulk film that is then loaded into a pre-loaded camera of a conventional type. Although the image on a continuous reel can be repetitively transferred to the bulk film, the bulk film must then be loaded into standard film cassettes or into a pre-loaded camera in a low light environment in which the remaining portions of the film strip are not exposed. This approach also employs a continuous border surrounding each frame, thus limiting the area available for exposing the principal image. The pre-exposed image must also be precisely aligned with the lens and the aperture frame in which the pre-exposed film is to be used, if the two exposures are to be properly aligned in the finished photographs.

SUMMARY OF THE INVENTION

The instant invention is intended to simplify, if not totally eliminate, the alignment problems that must be resolved for prior art multiple exposure photographs. The pre-exposed image of this invention is formed by a contact exposure method, as opposed to a employing a projected image which is more difficult to accurately locate. Furthermore, the film is pre-exposed and then loaded into a film cannister in the same light tight enclosure, so there is no need to protect the larger unexposed portion of the film strip from inadvertent exposure. The pre-exposed film strip generated in accordance with this invention may also not require precise registration in the camera in which it is to be used, if the pre-exposed section is not a discrete single image, and it can be either pre-loaded into a single use type camera or it can be loaded into a camera by the user.

A photographic film strip in the form of a length of photographic film has a pre-exposed area and an unexposed area. The pre-exposed area is continuous and extends along one edge of the strip between ends of the strip. The unexposed area is also continuous and has a length suitable for making multiple single exposure frames with adjacent frames being separated by a frame line. Upon development of the film, an image formed by the pre-exposed section of each print will extend between opposite edges of prints formed by individual frames without the need to preregister the film in a camera. The pre-exposure comprises a contact exposure.

An apparatus for pre-exposing a first portion of a photographic film strip for subsequent use in a camera in which a remaining portion of the photographic film strip is to be exposed is also disclosed. The apparatus includes a light tight enclosure and a cylindrical drum located in the light tight enclosure. The apparatus also includes a master image disposed on a peripheral rim of the cylindrical drum. The master image has an opaque section and an image section. A light source is located on the interior of the cylindrical drum. An initially unexposed photographic film strip is held in registry with the master image, with the first portion in registry with the image section of the master image and with the remaining portion of the photographic film strip in registry with at least part of the opaque section of the master image. The light source can be activated to expose the first portion of the photographic film strip, between its opposite ends, in a single flash.

One process for fabricating a photographic film strip having a pre-exposed first section and an unexposed second section starts with the step of fabricating a master film strip by successively exposing a portion adjacent one edge of the film strip to a first image through a frame aperture having one area with a width greater than the width of a frame to be exposed in the camera. A pre-exposed first portion therefore has a length greater than the width of the frame. The master film strip is then positioned in contact with the photograph film strip with an emulsion side of each film strip contacting an emulsion side of the other film strip. Only the portion of the photographic film strip in contact with the pre-exposed first portion of the master film strip along one edge is exposed so that the pre-exposed first section will extend laterally beyond opposite edges of each frame to be formed on the photograph film strip. Then it will not be necessary to precisely position the photographic film strip when it is loaded into the camera.

A partially exposed photographic film of this type can be used in either a preassembled camera-film package and in a camera that is loaded by the user. One such camera includes a shiftable partition located adjacent one edge of a film frame aperture. The shiftable partition is movable between a first and a second position. When the shiftable partition is in the first position, the film frame aperture is completely open. When the shiftable partition is in the second position, a portion of the film frame aperture along the one edge is blocked to prevent exposure of film behind the shiftable partition. This camera can be used with a standard unexposed film strip when the shiftable partition is in the first position. The same camera can be used with a partially pre-exposed film strip when the shiftable partition is in the second position.

BRIEF DESCRIPTION OF THE DRAWINGS

FIGS. 7A–7E are views of a light tight exposure assembly in which film strips housed in film canisters can be pre-exposed along one edge by a single flash.

DETAILED DESCRIPTION OF THE PREFERRED EMBODIMENT

Figure 1:
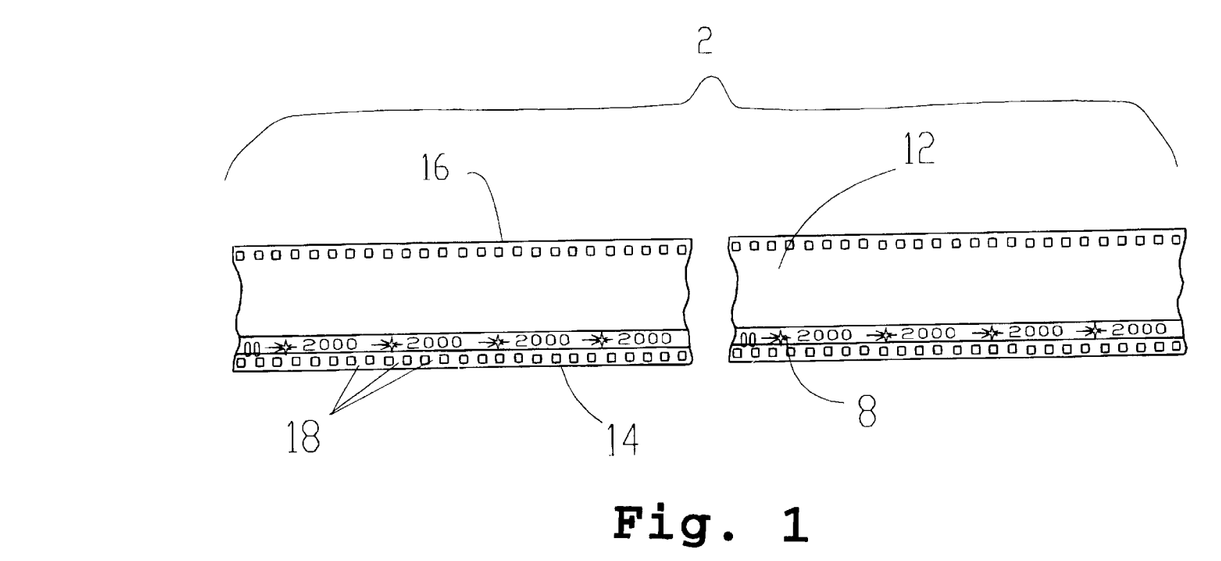
FIG. 1 is a view of a fully exposed photographic negative film strip having continuous pre-exposed section along one edge and a second area for a plurality of subsequently exposed frames.

FIG. 1 is a view of a pre-exposed film strip 2 showing a pre-exposed area or portion 8 extending along one edge 14 of the film strip 2. For purposes of clarity, this pre-exposed area or portion 8 is shown as a fully developed image, although it should be understood that the pre-exposed area 8 would normally only be developed after the remaining portion of the film strip 2 has been exposed to create a series of photographs or frames containing both images. A common use of a film strip 2 containing separately exposed images of this type is for the pre-exposed area 8 to include a title or caption that will be incorporated into each separate photograph when the film is developed. As shown in FIG. 1, this pre-exposed portion 8 of the film strip 2 comprises a continuous stripe or banner 8 extending along one edge 14 of the film strip adjacent one of the rows of sprocket holes 18 in the film. This pre-exposed stripe or banner 8 will extend substantially between opposite ends of the film strip 2 and is not separated into distinct frames. In other words, this pre-exposed portion 8 of the film 2 is not separated by frame lines which would define the edges of separate photographs on the photographic film strip. Although not shown, this pre-exposed portion 8 of the film strip need not extend completely to the film leader 30 or the trailing end 28 of the film engaging a spool in a film cannister 24 in which the film strip 2 will be located. Since these areas at the opposite ends of the photographic film strip will not include photograph frames, there is no need for the pre-exposed areas to extend into these remote areas of the film strip. It should be understood, however, that this pre-exposed stripe or banner 8 could extend into these areas at either end of the strip of film. Although the embodiment shown herein shows the pre-exposed area 8 along only the lower edge 14 of the film 2, a similar continuous pre-exposed stripe could be located along the top edge 16 or along both the upper and lower edges of the photographic film strip. Although it would be somewhat limiting with respect to the broader aspects of this invention, the pre-exposed area 8 could be in the form of a border extending completely around the frame area. Further discussion will, however, show that a surrounding border of this type can limit the use of such a pre-exposed strip to only a few of the applications that are otherwise suitable for a pre-exposed film 2 with a continuous pre-exposed banner or stripe 8 located only along one or both of the top or bottom edges of the film strip 2.

Figure 2:
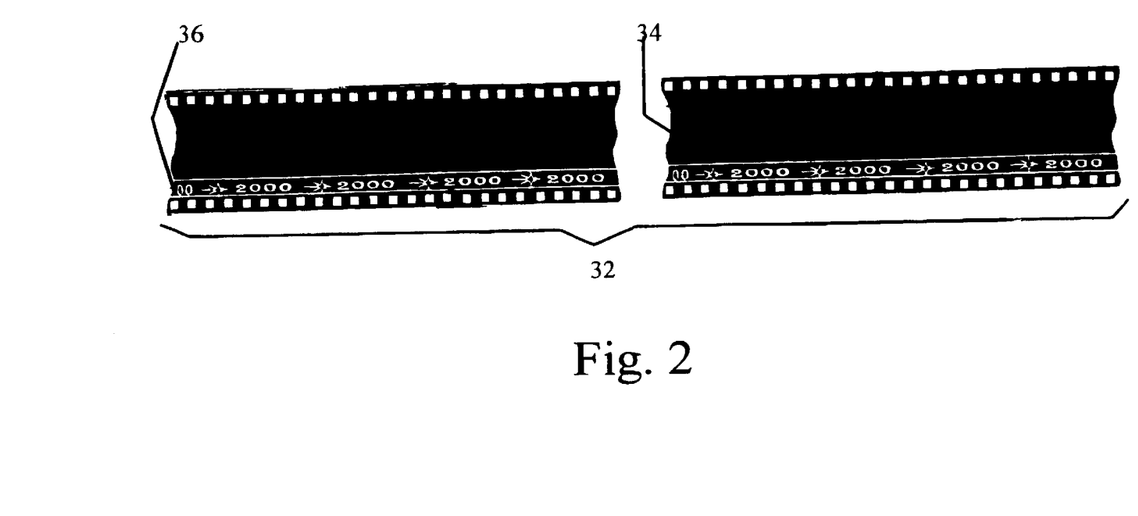
FIG. 2 is a view of a section of a master film strip negative, having a pre-exposed section along one edge, that is used for partially exposing film strip on which a plurality of frames will be subsequently exposed.

FIG. 2 shows a master image film strip 32 that is used to fabricate the pre-exposed photographic film 2 shown in FIG. 1. The film strip 32 shown in FIG. 2 is a positive. Only those areas 36 that are to be pre-exposed to form the film strip shown in FIG. 1 are translucent and will transmit light when the master image shown in FIG. 2 is used to form a contact image on the film strip 2 shown in FIG. 1. This pre-exposed contact print image will be formed by placing the emulsion side 38 of the master image film strip 32 in contact with the emulsion side 4 of the photographic film 2 on which the image is to be formed. See FIG. 7E. By placing the two film strips in registry, with corresponding sprocket holes in each film strip in alignment, the continuous master image on the master image film strip 32 will be transmitted to the pre-exposed area 8 of the photographic film strip 2 as represented in FIG. 1. The section of the master image film strip 32, that corresponds to the unexposed portion 12 of the photographic film strip 2 shown in FIG. 1, is opaque so that no light can expose the unexposed portion 12 when the two strips are in registration.

Figure 3:
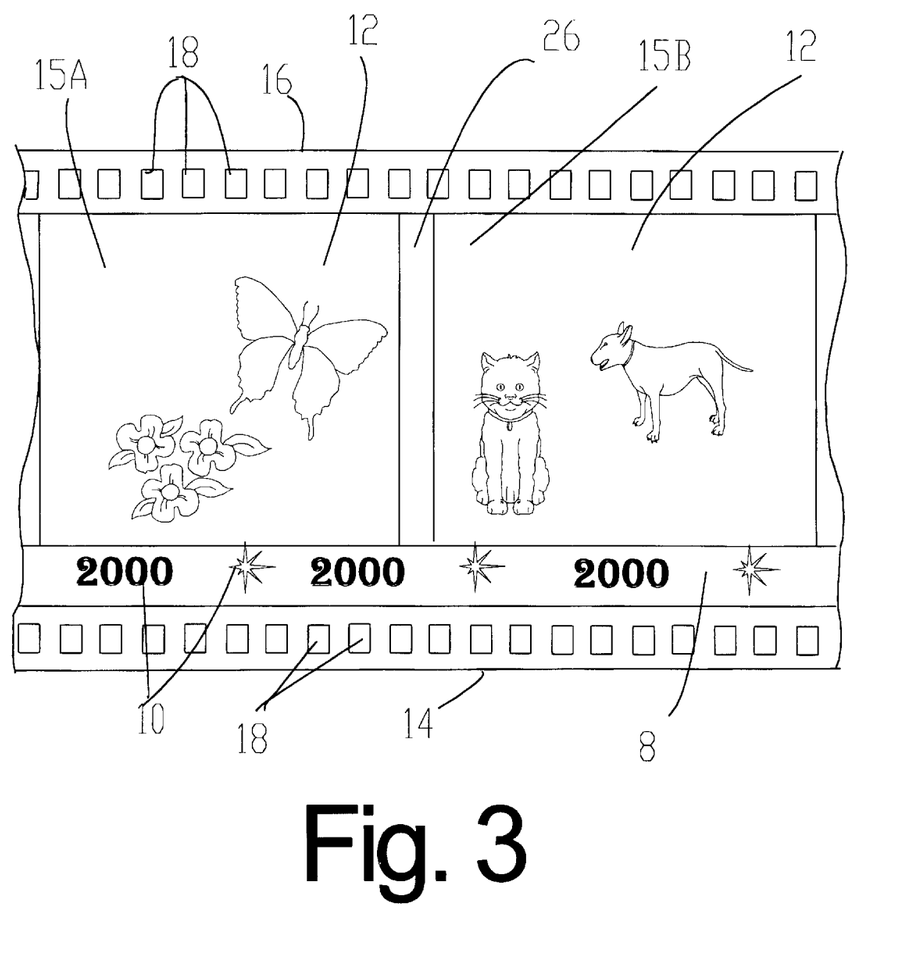
FIG. 3 is an enlarged view of a section of the film strip shown in FIG. 2 showing two adjacent exposed frames.
Figure 4A:
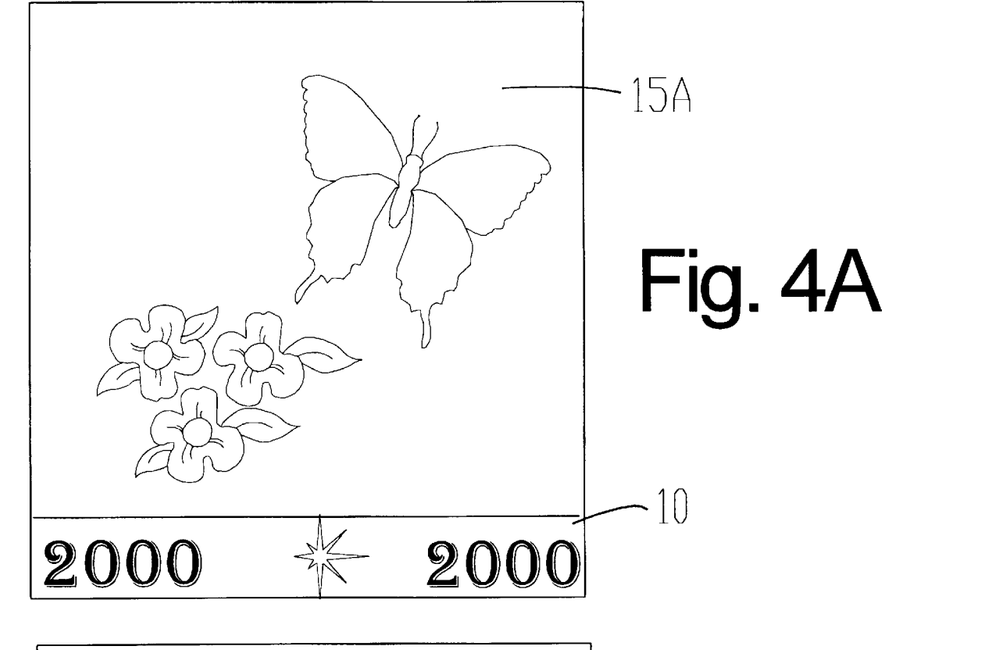
FIGS. 4A and 4B are views of the photographs formed by the two negative exposures shown in FIG. 3 in which alignment between a pre-exposed banner along one edge and the frame differs slightly in the two photographs made from adjacent negatives.
Figure 4B:
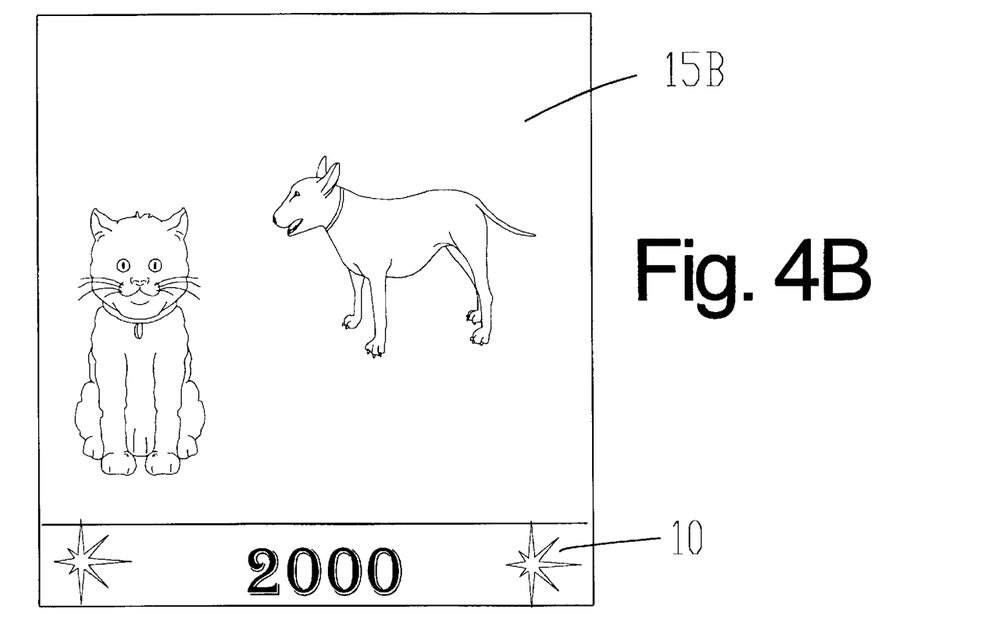

FIGS. 3 and 4A & B illustrate the complete photographs that can be taken using a pre-exposed film strip 2 as shown in FIG. 1. FIG. 3 shows a portion of the continuous length of developed images on a continuous film strip, before they are cut into separate photographs. It should be understood that the individual frames would occupy corresponding positions on the negative strip from which these finished photographs would be made. FIG. 3 shows a section of a film strip showing a frame line separating two adjacent photographs. Note that the frame lines 26 extend between the two portions of the film containing the primary images located in those portions 12 of the film strip that were not exposed when the portion 8 along the lower edge was pre-exposed. The frame lines 26, do not however extend into the continuous pre-exposed stripe or banner 8 extending along the lower edge 14 of the photographs. It is also important to note that the title lines along the lower edges of the photographs shown in FIGS. 4A and 4B are not identical. Since the pre-exposed stripe along the lower edge is a continuous image 10, it is not necessary to precisely align this banner with the frames or frame lines 26. By forming this pre-exposed stripe 8 as a repetitious image 10, the same information can be conveyed regardless of the precise position of the title bar relative to the photographic frame or the final photograph image. In the representative embodiment shown herein, the title bar is shown as a simple repetition 10 of two separate images, a figure image and text image. This simplified image is merely used to illustrate the result that can be achieved. Normally a more complex repetitious image would be incorporated into the pre-exposed portion of the film. Once the master image 32 has been fabricated in this manner, the next step is to transfer that image to multiple photographic film strips in an efficient manner.

Figure 5:
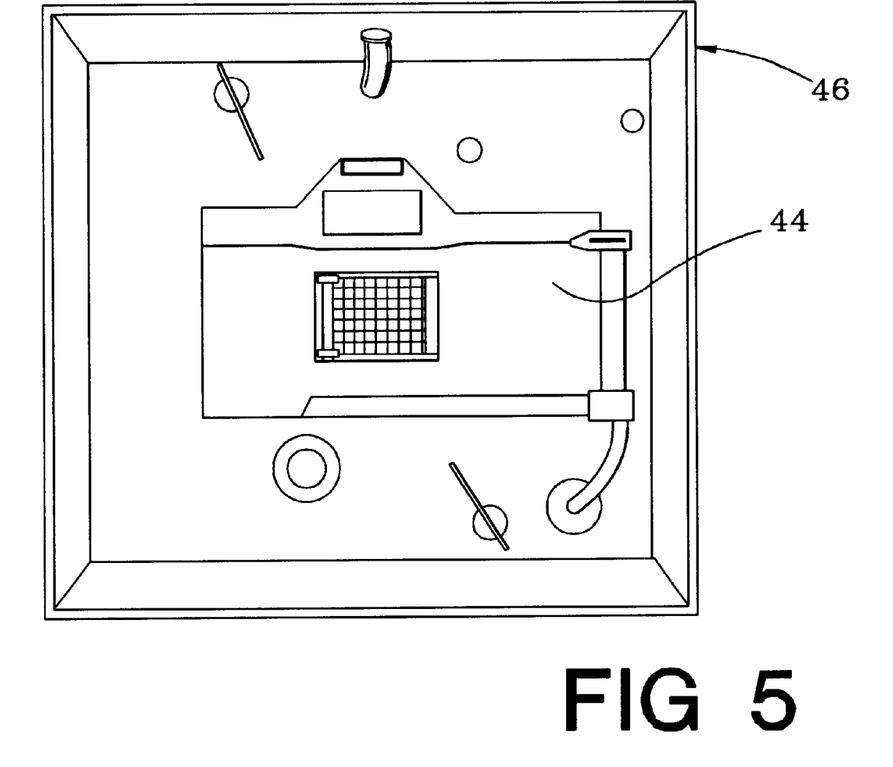
FIG. 5 is a view showing how a camera and a film recorder can be used to made a master film strip such as that shown in FIG. 1.
Figure 6:
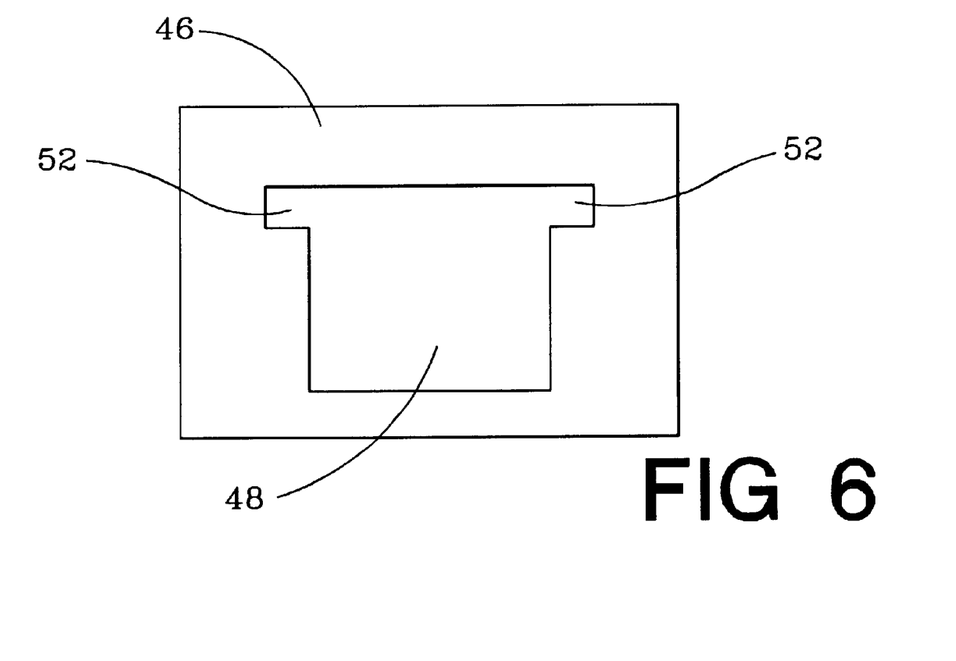
FIG. 6 is a view of the film frame plate of the camera in FIG. 5 that includes laterally extending openings that allow exposure of a continuous strip on the master image film strip.

The continuous master image 32 for pre-exposing a portion 8 of the film to ultimately include separate images can be fabricated by first generating a single image that will be repetitively used to form the continuous section 10 on the master image film strip 32. This single image can be generated as a computer image in a convention manner it can be a photograph. This image can be transferred to the master image film strip by employing a conventional film recorder having a 4×5 aperture which will generate an image with a width of 1.5 inches, larger than a standard 35 mm frame. A 35 mm automatic camera 44 containing the film strip used to generate the master image 32 when mounted in engagement with the film recorder 46 as shown in FIG. 5. The width of the image generated by the film recorder 46 is chosen so that it is wider than that which would ordinarily be exposed within a frame of a conventional 35 mm camera. In other words, the image generated by the film recorder is wider than the distance between frame lines 26 or the width of an ordinary 35 mm frame. To expose the master image film strip 32 to this wider image, the standard backplate of the automatic camera 44 is replaced by a backplate having notches or lateral extensions 52 on opposite sides of the frame aperture 48, as shown in FIG. 6. In other words the frame aperture is enlarged. Alternatively, the width of the entire film frame aperture can also be increased. Thus as the film in the automatic camera is advanced one frame at a time, the pre-exposure image on the master film strip 32 will be formed by repetitions of the single image. The ends of each pre-exposure frame image will mesh with the adjacent edge of the next image so that a repeating continuous image will be formed along at least one edge of the master image film strip. Since the camera is mounted directly on the film recorder, the image can be precisely transferred to the master. Successive image segments will be precisely aligned and there will be no gaps or offsets between successive segments of the continuous per-exposure image on the master. Simple projection of the image onto the master, as is suggested by the prior art, will result in a jagged or uneven strip which will adversely affect the final dual image photograph.

FIGS. 7A–7E show an apparatus 50 for pre-exposing a portion of a photographic film strip 2 that has been loaded in a conventional film cannister 24. This apparatus permits pre-exposure of only part of the film 2 in the cannister 24 in a light tight environment. The film cannister 24 is first loaded in the light tight enclosure 54 and the film leader 30 is attached on the peripheral rim 58 of a cylindrical drum 56. A master image strip 32 has been previously mounted on the rim 58 of the cylindrical drum 56. Rotation of the cylindrical drum 56 causes extraction of the film strip 2 from the film cannister 24. The emulsion side 38 of the master image film strip 32 faces radially outward on the cylindrical drum 56, and the emulsion side of the film strip 2 to be pre-exposed is oriented to face inwardly and in contact with the emulsion side 38 of the master image film strip 32. A light source 74 located in the center of the drum 56 is activated after the film strip 2 is completely extracted and is in registry with the master image film strip 32. Only a portion of the film strip 2 will be exposed because an opaque section 34 of the master image film strip 32 will mask the remaining portion 12 of the film strip 2. After a portion of the film strip 2 is pre-exposed in this manner, the cannister spool and the cylindrical drum 56 are rotated in the opposite direction to return the now partially pre-exposed film strip 2 to the film cannister 24.

Figure 7A:
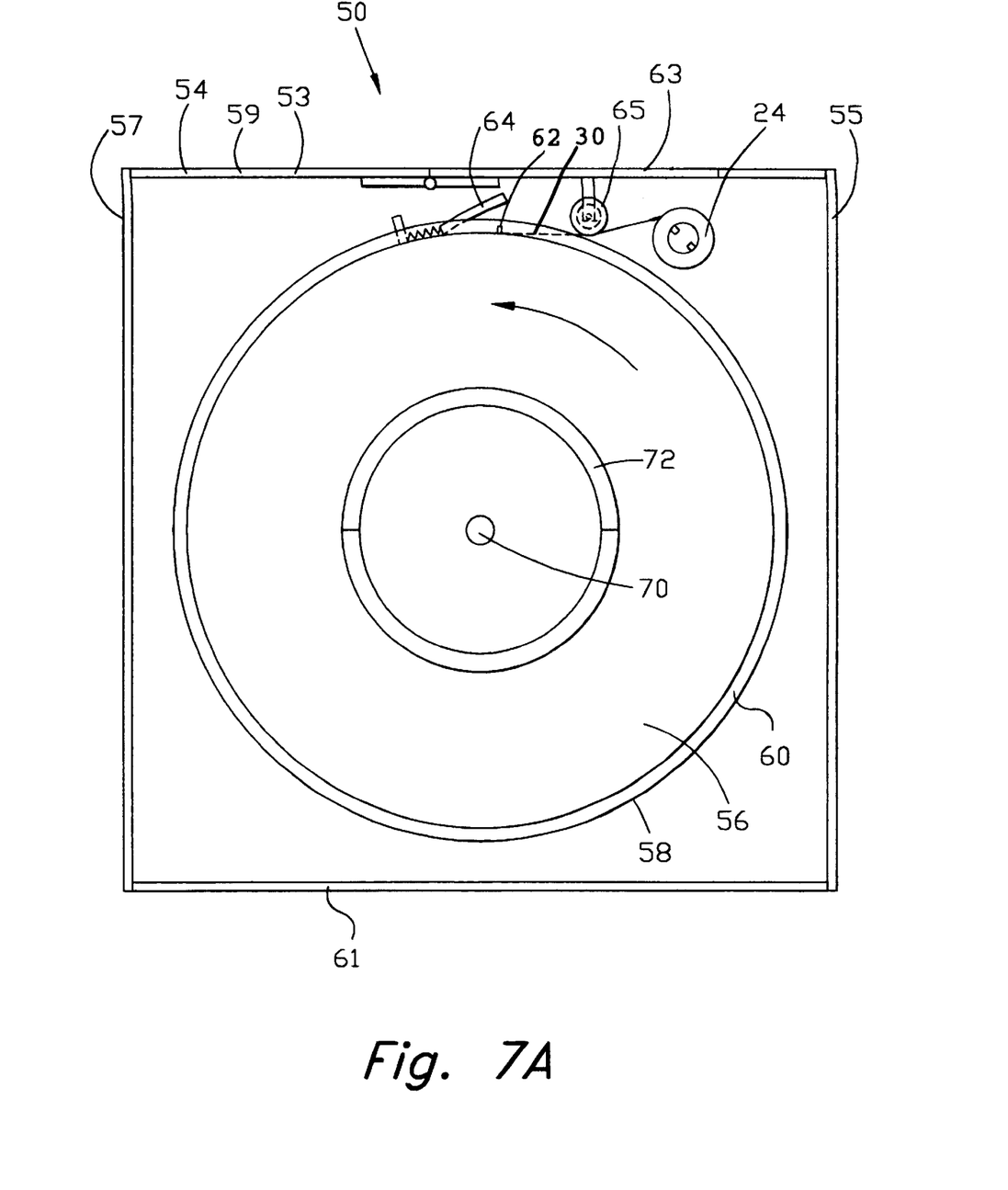
FIG. 7A is a side view of a rotatable cylindrical drum on which a film master is mounted.
Figure 7B:
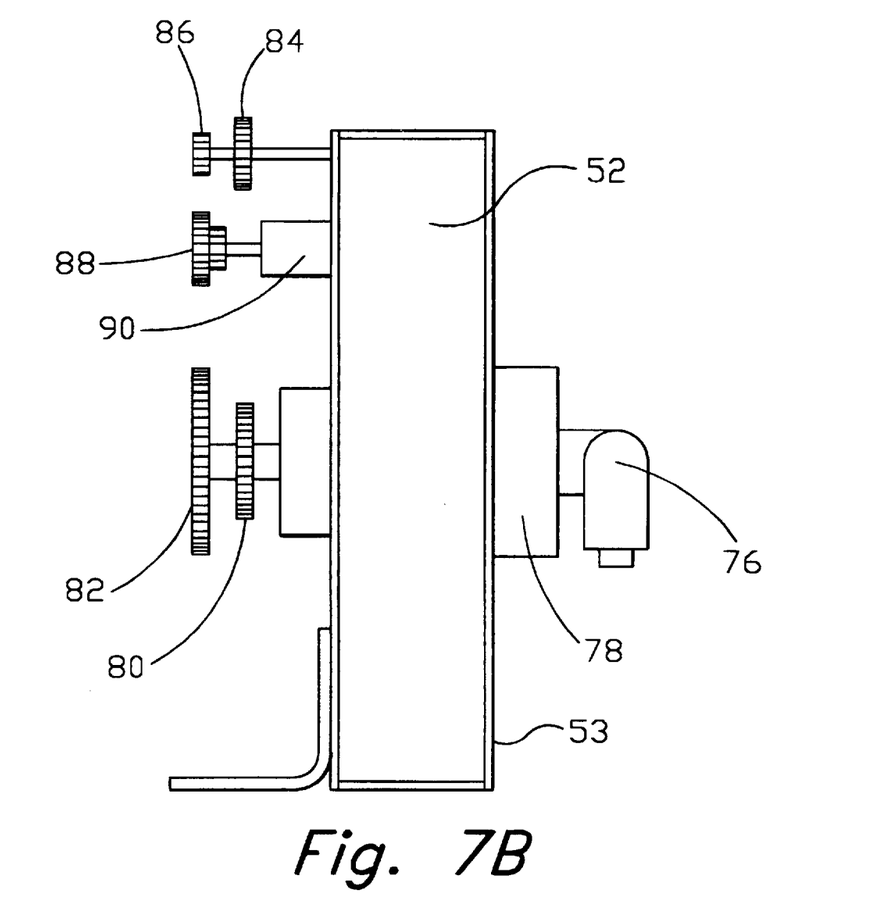
FIG. 7B is an end view of the light tight enclosure.
Figure 7C:
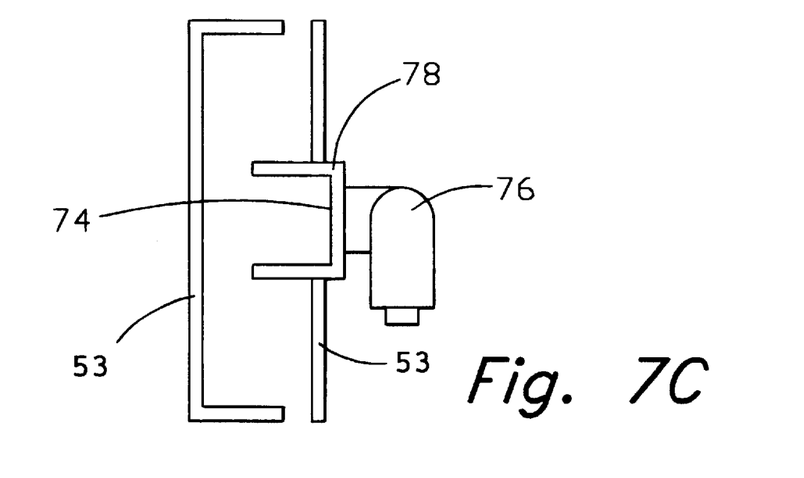
FIG. 7C is a side view showing the interior components.
Figure 7D:
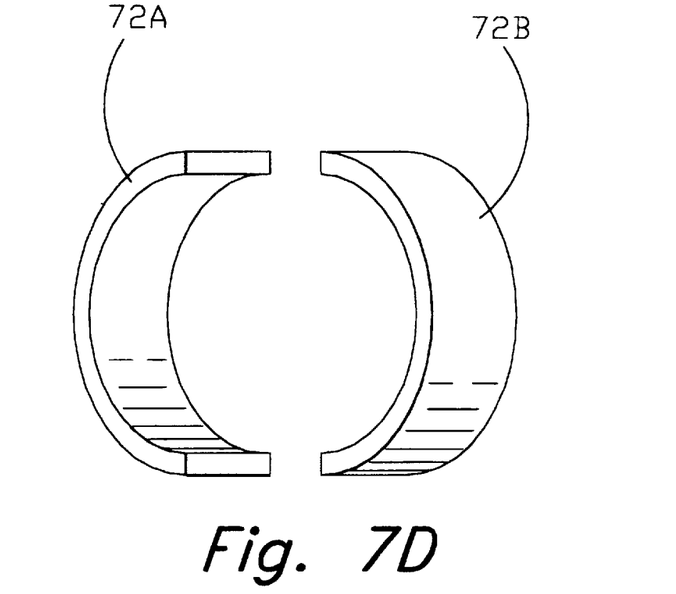
FIG. 7D is a view of a translucent diffusion band used to diffuse the light from the flash unit located at the center of the cylindrical drum.

The cylindrical drum 56 has a width sufficient to receive a 35 mm film strip between opposite edges of its peripheral rim 58. The diameter of the cylindrical drum 56 is chosen so that the circumference of the drum is sufficient to receive at least a thirty-six exposure 35 mm film strip. The peripheral rim 58 includes a translucent outer diffusion band 60 formed of a non-opaque plastic that will transmit sufficient light to pre-expose a portion of the film strip placed in contact with the emulsion side 38 of the master image film strip 32. The circumferential surface of the outer diffusion rim is chosen in conjunction with the intensity of the light source 74 so that the pre-exposed portion 8 of the film strip 2 will have an exposure that is approximately midway between exposure limits that would be anticipated when the a user would employ or encounter in making photographs with a camera in which the partially pre-exposed film strip 2 would be used.

The master film strip 32 is positioned on this peripheral rim 58 with the emulsion side facing radially outward. One end of the master film strip 32 is secured to the cylindrical drum 56 by two register pins 62 that protrude outwardly from the peripheral rim 58. The two register pins 58 are located on either side of the peripheral rim 58 to fit within sprocket holes along the edge of the master film strip 32. The master film strip 32 is positioned so the register pins 62 extend through specific reference sprocket holes in the master film strip. Typically the reference sprocket holes are the eighteenth (18) sprocket holes from one end of the master film strip 32. A spring loaded clip 64 adjacent to the register pins 62 is employed to hold that end of the master film strip 32 against the cylindrical drum 56. The opposite end of the master film strip is also clamped to the peripheral rim 58 of the cylindrical drum 56, and an adjustable stop member is positioned near that end of the master film strip 32 so that it will engage a surface on the outer enclosure 54 to limit rotation of the cylindrical drum 56.

The cylindrical drum 56 is mounted on a spindle 70 in a light tight enclosure or box 54 so that the cylindrical drum 56 can rotate about the spindle 70 within the light tight outer box enclosure 54. The outer enclosure 54 includes two side walls 53, a front and a rear wall 59, 61 and top and bottom walls 55, 57. One of the side walls 53 can be opened to provide access to the cylindrical drum 56. Access to the cylindrical drum 56 is also provided by a hinged loading door 63 located on a top wall 59 of the outer enclosure 54. The loading door 63 pivots outwardly and can be latched to the top wall 59 in the closed position. The master film strip 32 can also be mounted on the cylindrical drum 56 when the loading door 63 is in its open position. The master film strip 32 can be first mounted on the register pins 62 and the opposite end can be attached using separate clips. The cylindrical drum 56 can be rotated to permit the opposite ends of the master film strip 32 to be attached through the open loading door 63, or one of the side walls 53 can be partially opened so that the master film strip 32 can be mounted on the peripheral rim 58 of the cylindrical drum 56.

A film cannister 24 containing the photographic film strip 2 to be partially pre-exposed can also be loaded through the open loading door 63 at the top of the enclosure box 52. A film cannister mounting member in the form of a spring loaded rod is located inside the open loading door 63 near the outer periphery of the cylindrical drum 56. A rotating shaft will engage a spline on the interior of the spool in the film cannister 24. The film cannister 24 is loaded in the enclosure 54 with the protruding film leader 30 extending toward the register pins 62. The two register pins 62 are fitted within a preselected pair of sprocket holes 18 so that the film 2 to be partially exposed is in registry with the master image film strip 32 previously mounted on the cylindrical drum 56. The end of the film leader 30 is positioned beneath the film clip 64 and the outer loading door 63 is then closed. When the drum 56 is rotated through one partial revolution, the film 2 in the film cannister 24 is drawn out and is deployed with the emulsion side of the film 2 to be partially exposed positioned in contact with the corresponding emulsion side 38 of the master image film strip 32 so that a contact print can be formed. Before the cylindrical drum 56 is rotated, the loading door 63 is closed and film follower wheels 65 on the inside of the loading door 63 engage the film 2 between the cannister 24 and the register pins 62 so that the film 2 from the cannister 24 is smoothly placed along the circumference of the cylindrical drum peripheral rim 58.

Figure 7E:
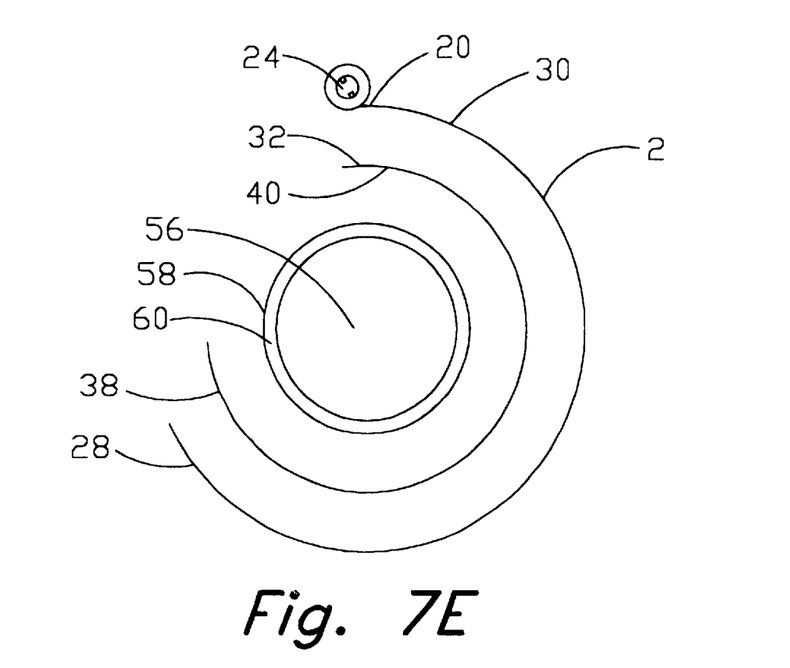
FIG. 7E is an exploded view showing the relative positions of the cylindrical drum, the master image film and the film to be pre-exposed.

When the film 2 has been completely drawn from the film cannister 24 by rotation of the cylindrical drum 56, a light source 74 located at the center of the cylindrical drum 56 is activated to partially expose the film 2 positioned in contact with and along the outer emulsion surface 38 of the master image film strip 32. Since a section 34 of the master image film strip 32 is opaque, the portion 12 of the outer film strip 2 in contact with that opaque section 34 will not be exposed when this light source 74 is activated. The image on the image section 36 of the master image film strip 32 is transferred to the corresponding portion 8 of the film strip 2 being partially exposed. After partial exposure of the film 2, the cylindrical drum 56 and the spool in the film cannister 24 are rotated in the opposite direction so that the now partially exposed film 2 can be returned to the film cannister 24. The film cannister 24, which is also light tight, can now be removed from the light tight box enclosure 54.

An electronic flash unit 76 is used to provide the light source 74 for partially exposing the film 2 extracted from the film cannister 24. The conventional electronic flash unit 76 is mounted in a flash housing 78 on one side of the outer enclosure 54. Although the flash unit 76 is located to the side of the cylindrical drum 56, that adjoining side face of the cylindrical drum 56 is open. Inner translucent bands 72 can be added around the drum spindle 70 to further diffuse the light from the electronic flash unit 76. Two semi-cylindrical bands 72A, 72B will encircle the central cylindrical cavity from which the light source 74 emanates to form one inner diffusion band 72. Multiple layers of inner diffusion bands 72 can be added if necessary or the relative transparency of these inner diffusion bands 72 can be varied to achieve the proper exposure. If the outer diffusion surface 60 on the peripheral rim provides adequate light diffusion, the inner bands 72 will not be needed.

Rotation is imparted to the cylindrical drum 56 and the film cannister 24 by an electric motor 90 that drives an upper pulley 86 and a lower pulley 82. The upper pulley 86 is located in an upper transfer unit 84 and rotation of this upper pulley shaft imparts rotation to the spool of the film cannister 24. The lower transfer unit 80 is located in the center of one side of the box enclosure 54 so that the lower pulley shaft drives the cylindrical drum 56. Conventional belts (not shown) connect the electric motor to the pulley shafts. A counter weight is located on the cylindrical drum 56 so that uneven loads are not placed on the electric motor 90, and rotation of the drum 56 will be smooth.

This film exposure apparatus 50 is especially adapted for partially exposing film strips 2 as part of a moderate or intermediate size run. Film in standard canisters 24 can be used, and no special handling is necessary because the film 2 is enclosed in the light tight box enclosure 54 during exposure and is located in the light tight film cannister 24 as the film is loaded into and unloaded from the film exposure apparatus 50.

Figure 8:
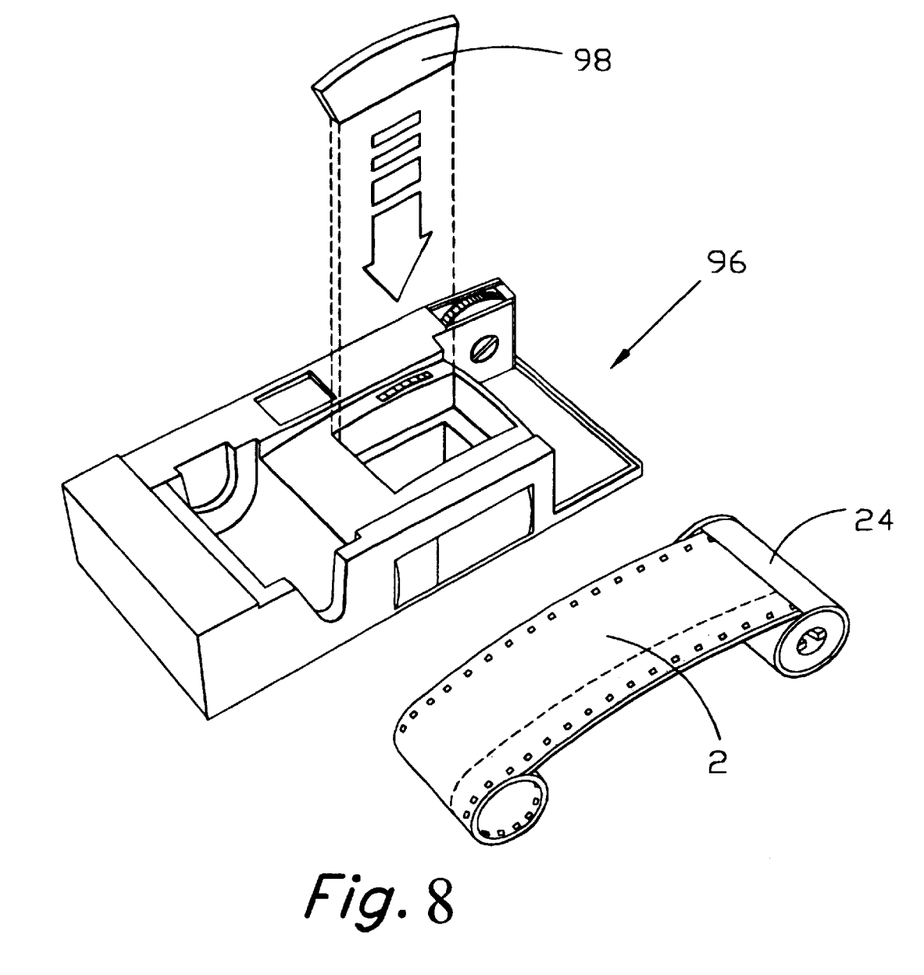
FIG. 8 is a view of a single use camera that includes an insertable partition that permits use of the camera with either a standard unexposed roll of film or alternatively with a strip of film having a pre-exposed strip along one edge.
Figure 9A:
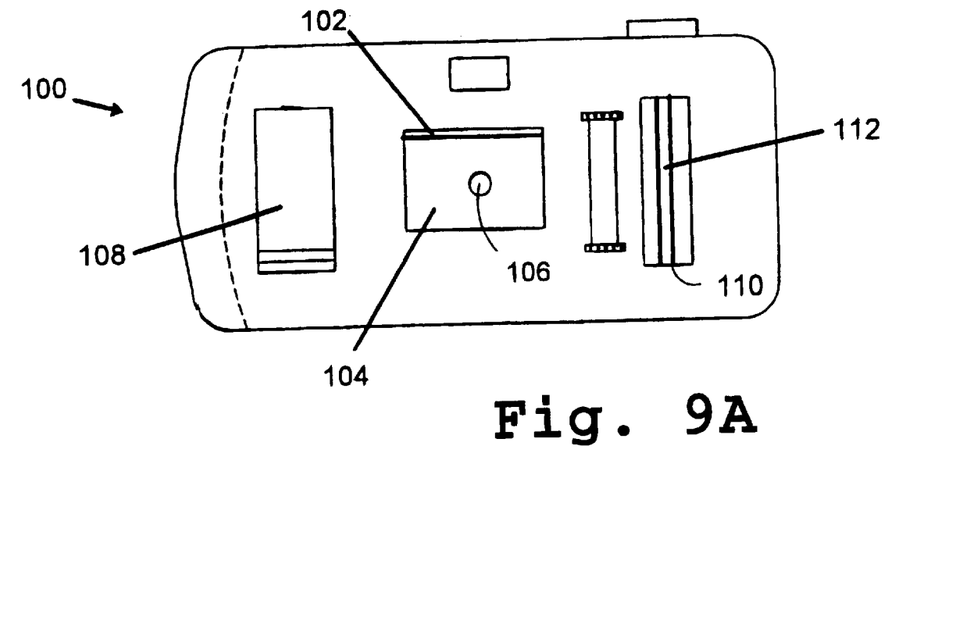
FIGS. 9A and 9B are views of the manner in which shiftable partition can alternatively close a portion of a film frame aperture to cover a pre-exposed section of a film strip along one edge.
Figure 9B:
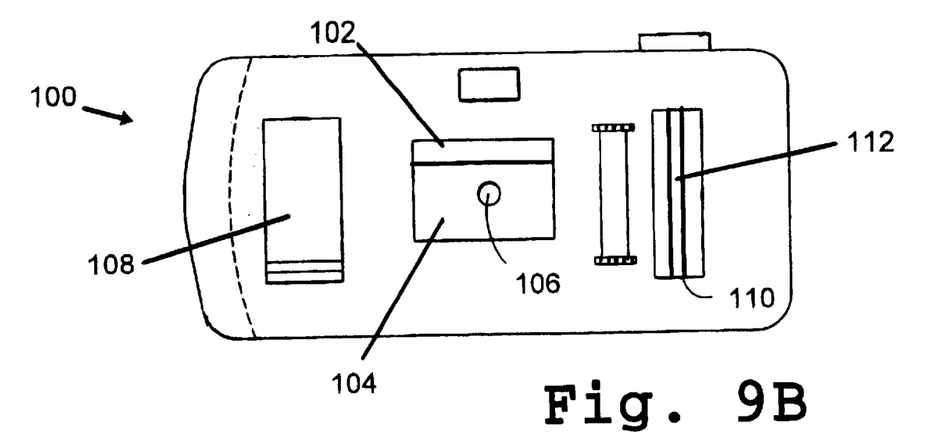
Figure 9C:
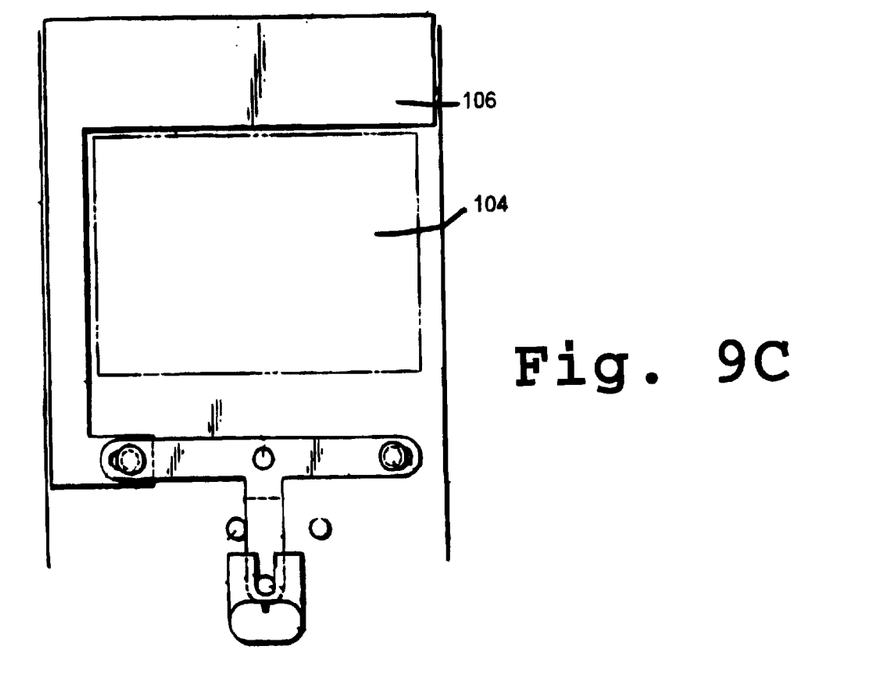
FIG. 9C shows the shiftable partition in its open position and FIG. 9D shows the shiftable partition moved to partially close the film frame aperture.
Figure 9D:
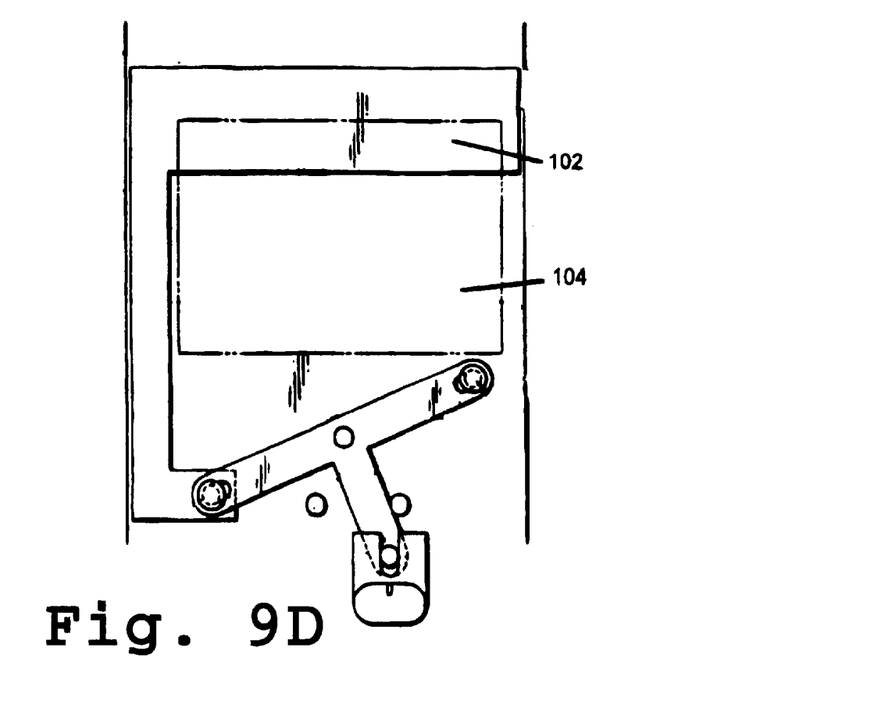

FIG. 8 shows a standard pre-loaded single use or pre-loaded camera 96 in which a pre-exposed photographic film strip 2 would be used. A film cannister 24 containing the pre-exposed film would be loaded in this pre-loaded camera 96. The pre-exposed film 2 would not be loaded by the end user, but would be loaded by the supplier of the pre-loaded camera 96. After the entire roll of film is developed, the entire camera 96 is then returned to the manufacturer who removes the film from the camera and develops the film containing the two separate images in each photograph. Normally the photographic film strip would be loaded so that the pre-exposed image would be aligned with each frame. However, since the image 10 of the present invention is continuous and is therefore wider than the frame, it is not necessary to precisely align the pre-exposed image with the frame. A portion of the repetitive image will still appear in the final photograph. Since the image is repetitive, it is not important that the pre-exposed image be exactly the same in every photograph. Therefore in addition to employing the pre-exposed film only with factory manufactured pre-loaded cameras, the pre-exposed film of this invention can be sold separately and the film can be loaded and developed by the end user. However, as with prior art pre-loaded cameras of this type, an insert 98 would be added along the top or bottom of the film frame aperture to block the pre-exposed portion of the film and to prevent double exposure.

A 35 mm camera 100 into which a standard film cannister 24 including either partially pre-exposed film 2 or a film strip that has not been previously pre-exposed is shown in FIGS. 9A–9D. This camera does not require insertion of a lose piece insert 98 to block a second exposure of the pre-exposed portion 8 of the film 2. This camera includes a shiftable partition 102 that can be moved between two positions. In a retracted position, the entire film aperture 104 is open so that a film strip 2 and film frames can be completely exposed in a conventional manner. When the shiftable partition 102 is moved to an extended position, a portion of the film frame aperture 104 along one edge will be covered or blocked so that a pre-exposed portion 8, extending along one edge of photographic film strip, will not be exposed when the camera shutter is open. Unlike prior art single use or preloaded cameras, the film is exposed as it is pulled out of the film cannister 24 in a cannister cavity 108, that is located on one side of the lens 106 onto a take-up spool, located in a take up cavity 110, that is located on the opposite side of the lens 106 and the film frame aperture 104. In other words the film cannister 24 and the film 2 can be loaded in a conventional fashion instead of preloading a spool as for prior art single use cameras.

An alternate approach for making a limited number of film strips with a continuous image would not require the cylindrical drum. In this approach only a single pre-exposure image frame is used. This image has a width that is greater than the width of a standard frame. An automatic camera having a back plate forming an enlarged film frame aperture, substantially the same as that shown in FIG. 6 can then be used to sequentially expose the repetitious continuous image, from one single image, onto the film strip which would then be used to take dual exposures of the type shown in FIGS. 4A and 4B. The representative embodiment of this invention can therefore be replaced by other embodiments including slightly different components that would be apparent to one of ordinary skill in the art. Therefore the invention represented by the disclosed embodiment is defined by the following claims and is not limited to the precise structure depicted herein.

I claim:

1. An apparatus for pre-exposing a first portion of a photographic film strip for subsequent use in a camera in which a remaining portion of the photographic film strip is to be exposed, the apparatus comprising:

a light tight enclosure;

a cylindrical drum located in the light tight enclosure;

a master image disposed on a peripheral rim of the cylindrical drum, the master image including an opaque section and an image section and comprising a previously exposed film strip;

a light source located on the interior of the cylindrical drum; and means for holding an initially unexposed photographic film strip in registry with the master image with the first portion in registry with the image section of the master image and with the remaining portion of the photographic film strip in registry with the at least part of the opaque section of the master image;

and means for activating the light source to expose the first portion of the photographic film strip.

2. The apparatus of claim 1 wherein the image section of the master image extends substantially between opposite ends of the master image so that a first portion extending substantially between opposite ends of the photographic film strip can be exposed by a single activation of the light source.

3. The apparatus of claim 2 wherein the image section is substantially continuous so that a substantially continuous first portion of the photographic film strip can be exposed by a single activation of the light source.

4. The apparatus of claim 1 wherein the means holding an initially unexposed photographic film strip in registry with a master image comprises means for holding an emulsion side of the unexposed photographic film strip in contact with an emulsion side of the master image.

5. The apparatus of claim 1 wherein the cylindrical drum is rotatable about an axis and includes a film latching member adjacent one end of the master image so that after attachment of the unexposed photograph film to the film latching member, rotation of the drum results in deployment of the unexposed photographic film in registry with the master image.

6. The apparatus of claim 5 wherein a film cannister mount in located on the light tight enclosure adjacent cylindrical drum, so that a film cannister can be mounted on the film cannister mount and a film leader extending from the film cannister can be attached to a film latching member on the cylindrical drum so that rotation of the cylindrical drum initially draws the unexposed photographic film from the film cannister prior to exposure of the first section and wherein the photographic film, after exposure of the first section, can then be returned to the film cannister by rotation of the cylindrical drum an opposite direction.

7. The apparatus of claim 1 including a translucent strip located between the light source and the master image, the translucent strip comprising means for diffusing light from the light source.

8. The apparatus of claim 7 wherein the translucent strip is located between the light source and the peripheral rim of the cylindrical drum.

9. The apparatus of claim 8 wherein multiple translucent strips are located between the light source and the master image.

10. The apparatus of claim 1 wherein a continuous image is exposed along one edge of the master image, the continuous image extending between opposite ends of the master image.

11. The apparatus of claim 10 wherein remaining master image portions, other than the continuous image between opposite ends of the master image, are opaque.

12. An apparatus for pre-exposing a first portion of a photographic film strip for subsequent use in a camera in which a remaining portion of the photographic film strip is to be exposed, the apparatus comprising:

a light tight enclosure;

a cylindrical drum located in the light tight enclosure;

a master image disposed on a peripheral rim of the cylindrical drum, the master image including an opaque section and an image section wherein the image section of the master image extends substantially between opposite ends of the master image so that a first portion extending substantially between opposite ends of the photographic film strip can be exposed by a single activation of the light source;

a light source located on the interior of the cylindrical drum; and means for holding an initially unexposed photographic film strip in registry with the master image with the first portion in registry with the image section of the master image and with the remaining portion of the photographic film strip in registry with the at least part of the opaque section of the master image;

and means for activating the light source to expose the first portion of the photographic film strip.

13. An apparatus for pre-exposing a first portion of a photographic film strip for subsequent use in a camera in which a remaining portion of the photographic film strip is to be exposed, the apparatus comprising:

a light tight enclosure;

a cylindrical drum located in the light tight enclosure;

a master image disposed on a peripheral rim of the cylindrical drum, the master image including an opaque section and an image section and comprising a previously exposed film strip;

a light source located on the interior of the cylindrical drum; and means for holding an initially unexposed photographic film strip in registry with the master image with the first portion in registry with the image section of the master image and with the remaining portion of the photographic film strip in registry with the at least part of the opaque section of the master image, wherein the means holding an initially unexposed photographic film strip in registry with a master image comprises means for holding an emulsion side of the unexposed photographic film strip in contact with an emulsion side of the master image;

and means for activating the light source to expose the first portion of the photographic film strip.

14. An apparatus for pre-exposing a first portion of a photograhic film strip for subsequent use in a camera in which a remaining portion of the photographic film strip is to be exposed, the apparatus comprising:

a light tight enclosure;

a cylindrical drum located in the light tight enclosure;

a master image disposed on a peripheral rim of the cylindrical drum, the master image including an opaque section and an image section;

a light source located on the interior of the cylindrical drum; and     means for holding an initially unexposed photographic film strip in registry with the master image with the first portion in registry with the image section of the master image and with the remaining portion of the photographic film strip in registry with the at least part of the opaque section of the master image;

a translucent strip located between the light source and the master image, the translucent strip comprising means for diffusing light from the light source     and means for activating the light source to expose the first portion of the photographic film strip.

* * * * *